US008706725B2

(12) United States Patent
Bailey et al.

(10) Patent No.: US 8,706,725 B2
(45) Date of Patent: Apr. 22, 2014

(54) RANKING CONTEXTUAL SIGNALS FOR SEARCH PERSONALIZATION

(75) Inventors: Peter R. Bailey, Kirkland, WA (US); Sebastian De La Chica, Woodinville, WA (US); Aidan Crook, Bellevue, WA (US); Nikhil B. Dandekar, Bellevue, WA (US); Daniel R. Schwartz, Seattle, WA (US); William D. Ramsey, Redmond, WA (US); Nick Craswell, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 410 days.

(21) Appl. No.: 13/047,466

(22) Filed: Mar. 14, 2011

(65) Prior Publication Data
US 2012/0239646 A1    Sep. 20, 2012

(51) Int. Cl.
    *G06F 17/30*  (2006.01)
(52) U.S. Cl.
    USPC ............................. 707/733; 707/748; 707/769
(58) Field of Classification Search
    USPC .......................................... 707/733, 748, 769
    See application file for complete search history.

(56) References Cited

U.S. PATENT DOCUMENTS

| | | | |
|---|---|---|---|
| 7,698,331 B2 * | 4/2010 | Carson et al. | 707/728 |
| 2002/0073089 A1 * | 6/2002 | Schwartz et al. | 707/10 |
| 2006/0212423 A1 | 9/2006 | Jones et al. | |
| 2007/0239702 A1 * | 10/2007 | Vassilvitskii et al. | 707/5 |
| 2008/0109285 A1 * | 5/2008 | Reuther et al. | 705/7 |
| 2011/0022590 A1 * | 1/2011 | Yu | 707/728 |
| 2012/0084283 A1 * | 4/2012 | Chitiveli et al. | 707/728 |

OTHER PUBLICATIONS

Rong, et al., "A Survey of Context Aware Web Service Discovery: From User's Perspective", In Proceedings of the 2010 Fifth IEEE International Symposium on Service Oriented System Engineering, Jun. 4-5, 2010, pp. 15-22.

Noll, et al., "The Metadata Triumvirate: Social Annotations, Anchor Texts and Search Queries", In Web Intelligence and Intelligent Agent Technology, Dec. 9-12, 2008, pp. 640-647.

Berendt, Bettina, "Ranking—Use and Usability", In Bulletin of the Belgian Mathematical Society—Simon Stevin, vol. 16, Jun. 2009, 25 pages.

Sieg, et al., "Ontological User Profiles for Representing Context in Web Search", In Proceedings of the IEEE/WIC/ACM International Conferences on Web Intelligence and Intelligent Agent Technology, 2007, 4 pages.

(Continued)

*Primary Examiner* — Baoquoc N To
*Assistant Examiner* — Andalib Lodhi
(74) *Attorney, Agent, or Firm* — Doug Barker; Dave Ream; Micky Minhas

(57) ABSTRACT

Methods are provided for re-ranking documents based on user-specific features. Search results are received from a non-contextual ranking system such that the search results are not specific toward a particular user, such as the user who submitted the search query. Contextual signals are received and provide user-specific features that are used to re-rank documents so that the most important and relevant documents are listed at the top of the list of search results. Each of the user-specific features are evaluated and compared to determine a new position of each document. A set of contextual search results is then generated based on the new positions.

18 Claims, 6 Drawing Sheets

(56) References Cited

OTHER PUBLICATIONS

Lu, et al., "Personalize Web Search Results with User's Location", In Proceeding of the 33rd international ACM SIGIR conference on Research and development in information retrieval, Jul. 19-23, 2010, 2 pages.

Graepel, et al., "Web-Scale Bayesian Click-Through Rate Prediction for Sponsored Search Advertising in Microsoft's Bing Search Engine," Proceedings of the 27th International Conference on Machine Learning, 2010, 8 pp., Haifa, Israel.

* cited by examiner

RANKING CONTEXTUAL SIGNALS FOR SEARCH PERSONALIZATION

BACKGROUND

The amount of information and content available on the Internet continues to grow very fast. Given the vast amount of information, search engines have been developed to facilitate searching for electronic documents. In particular, users may search for information and documents by entering search queries comprising one or more terms that may be of interest to the user. After receiving a search query from a user, a search engine identifies documents and/or web pages that are relevant based on the search query. Because of its utility, web searching, that is, the process of finding relevant web pages and documents for user issued search queries has arguably become one of the most popular services on the Internet today.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to re-ranking documents that are in a list of search results produced by a ranking system that bases its ranking on only the query. User-specific features, however, may be used to re-rank these search results so that the search results presented to the user are ordered so that those that are believed to be more important and relevant to the user are located at the top of the list of search results. User-specific features may include many types of features, including temporal information, location information (e.g., of the user and the documents), information regarding a user's past searching behaviors (e.g., by accessing query log data), tasks in which the user is currently or previously engaged, demographic information, social-based information, etc. A machine-learning model is used in embodiments of the present invention to evaluate the user-specific features and compare them such that those that are the most important and relevant to the user, query, or documents are used to determine new positions of the documents. From here, a set of contextual search results is generated and returned to the user. Feedback from the user may be returned to the machine-learning model and used to teach the model how to provide better re-ranking in the future.

BRIEF DESCRIPTION OF THE DRAWINGS

The present invention is described in detail below with reference to the attached drawing figures, wherein.

DETAILED DESCRIPTION

Figure 1:
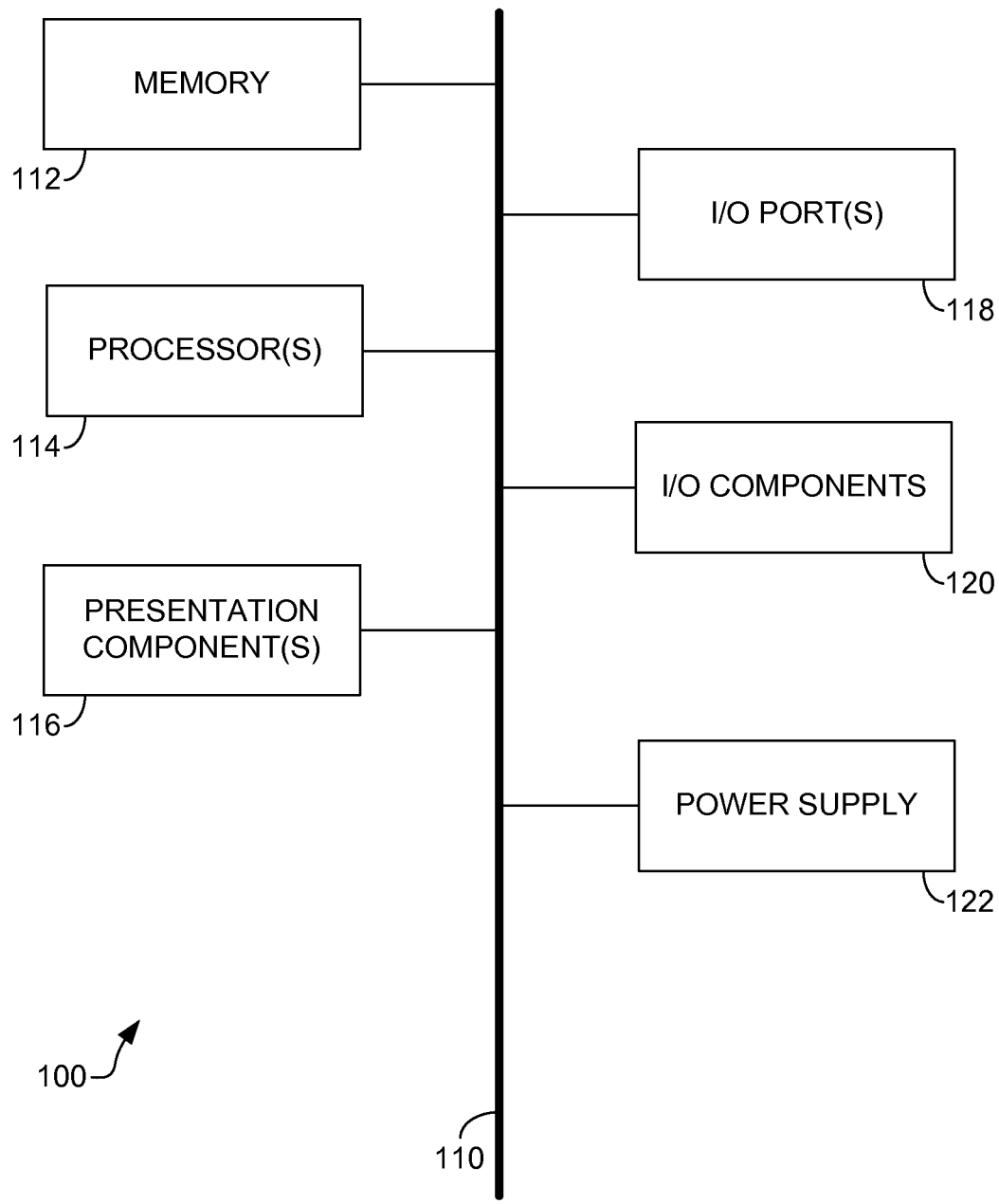
FIG. 1 is a block diagram of an exemplary computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As noted above, embodiments of the present invention provide for re-ranking of documents in a list of search results such that those documents most important or relevant to a particular user who submitted the search query are at the top of the list of search results. User-specific features are received from contextual signal providers. In order to put all of the user-specific features on the same playing field, an algorithm is used to evaluate and compare the user-specific features. In one instance, normalization is used to provide normalized scores so that the features can be more fairly compared. The scores may take into account the trustworthiness of the contextual signal provider based on its history, a confidence level provided by the contextual signal provider, or the like. The user-specific features are then applied to the documents to determine whether the documents should be re-positioned. A set of contextual search results is then returned to the user. The set of contextual search results, instead of being a new set of search results, is a re-ranked set of the non-contextual results.

Accordingly, in one aspect, an embodiment of the present invention is directed to one or more computer-storage media storing computer-useable instructions that, when used by a computing device, cause the computing device to perform a method for using multiple contextual signals to re-rank search results. The method includes receiving a set of non-contextual search results generated as a result of a search query entered by a user, receiving a set of contextual signals that include user-specific features that can be used to re-rank documents in the set of non-contextual search results, and evaluating each of the user-specific features to establish an importance or relevance of each of the user-specific features in relation to the user and the search query. Further, the method includes comparing the importance or relevance of the user-specific features with a current position of each document in the set of non-contextual search results and based on the comparison, algorithmically determining a new position of each document in the set of non-contextual search results. Additionally, the method includes utilizing the new position of each document in the list of search results to generate a set of contextual search results.

In another embodiment, an aspect of the invention is directed to one or more computer-storage media storing computer-useable instructions that, when used by a computing device, cause the computing device to perform a method for using multiple contextual signals to re-rank search results. The method includes receiving a set of non-contextual search results based on a search query received from a user, and receiving contextual signals that provide user-specific features associated with the user. Further, the method includes utilizing a machine-learning model that uses an algorithm to compare each of the user-specific features associated with the user to determine an importance and a relevance of each of the user-specific features in relation to the search query or documents that comprise the set of non-contextual search results. Additionally, the method includes re-ranking the documents in the set of non-contextual search results based on the comparison of the user-specific features to generate a set of contextual search results, receiving feedback from the user regarding the documents in the set of contextual search results, and communicating the feedback to the machine-learning model. The machine-learning model utilizes the feedback in its comparison of each of the user-specific features in determining the importance and the relevance of the user-specific features in relation to future search queries received from the user and other users.

A further embodiment of the invention is directed to one or more computer-storage media storing computer-useable instructions that, when used by a computing device, cause the computing device to perform a method for using multiple contextual signals to re-rank search results. The method includes receiving a set of non-contextual search results based on a search query received from a user, receiving a plurality of contextual signals that provide user-specific features, the plurality of contextual signals including a score indicating a relevancy of each of the user-specific features, and determining that each of the plurality of contextual signals meets a minimum threshold for being trustworthy in relation to the user and the search query. The method further includes converting the scores associated with the user-specific features into a common numerical space to generate normalized scores for the user-specific features and adjusting the normalized scores based on one or more of a level of trustworthiness associated with a contextual signal provider that provided a particular user-specific feature, or a position bias effect that indicates an effect of positioning a particular document in a certain position. Additionally, the method includes re-ranking documents in the set of non-contextual search results based on the adjusted normalized scores.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output (I/O) ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer-storage media and communication media. Computer-storage media includes both volatile and nonvolatile, removable and non-removable media implemented in any method or technology for storage of information such as computer-readable instructions, data structures, program modules or other data. Computer-storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 112 includes computer-storage media in the form of volatile and/or nonvolatile memory. The memory may be removable, non-removable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
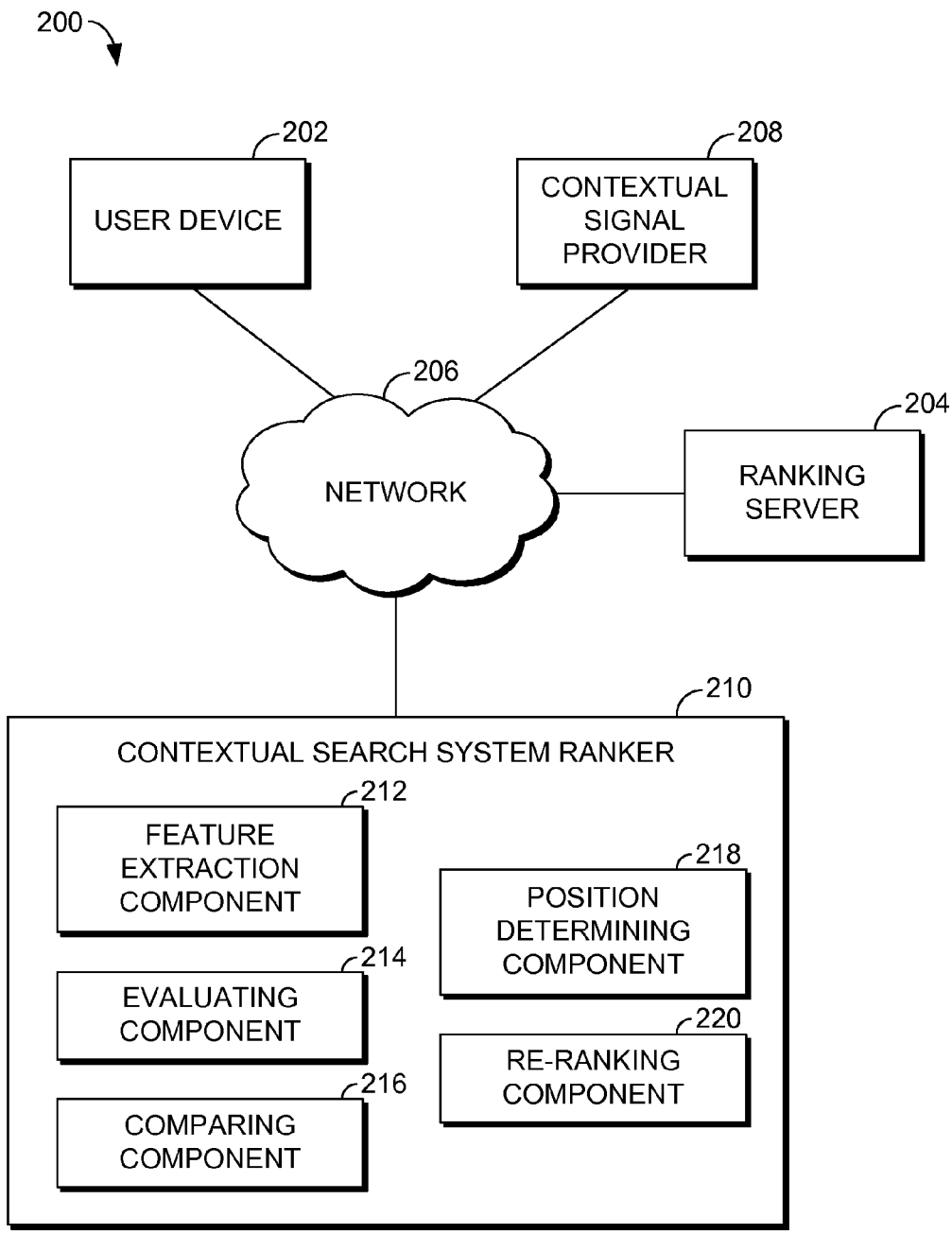
FIG. 2 is a block diagram of an exemplary system in which embodiments of the invention may be employed.

Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 includes a user device 202, a ranking server 204, contextual service providers 208, and a contextual search results generator 210. Each of the components shown in FIG. 2 may be any type of computing device, such as computing device 100 described with reference to FIG. 1, for example. The components may communicate with each other via a network 206, which may include, without limitation, one or more local area networks (LANs) and/or wide area networks (WANs). Such networking environments are commonplace in offices, enterprise-wide computer networks, intranets, and the Internet. It should be understood that any number of user devices, ranking servers, contextual signal providers, or contextual search results generators may be employed within the system 200 within the scope of the present invention. Each may comprise a single device or multiple devices cooperating in a distributed environment. For instance, although one contextual signal provider 208 is shown in FIG. 2, oftentimes there are multiple signal providers. Additionally, other components not shown may also be included within the system 200, while components shown in FIG. 2 may be omitted in some embodiments.

The user device 202 may be any type of computing device owned and/or operated by an end user that can access network 206. For instance, the user device 202 may be a desktop computer, a laptop computer, a tablet computer, a mobile device, or any other device having network access. Generally, an end user may employ the user device 202 to, among other things, access electronic documents by submitting a search query to a search engine. For instance, the end user may employ a web browser on the user device 202 to access and view electronic documents stored in the system.

The ranking server 204 receives, through the network 206, search queries from users and identifies documents that are most relevant to the query to send to the user in the form of search results. A ranking system may be used to rank the relevant documents in order of relevance such that the user sees the document that the ranking system considers to be the most relevant first, or at the top of the list of search results. The ranking system used by the ranking server 204 typically does not take into account any information related to the user who submitted the search query, but only information found in the search indexes. As such, the search results generated by the ranking server 204 are hereinafter called non-contextual search results.

The contextual signal provider 208 may actually be more than one provider, even though just one provider is shown here, and thus may be referred to herein as multiple providers. The contextual signal providers 208 provide contextual signals to the contextual search results generator. Generally, contextual signals include user-specific features that may affect the ranking of documents, and that can be derived from properties of the user. User-specific features can be used to craft personalized contextual relevance features during user interaction sessions or contextual relevance features based on entire cohorts of users in advance. As such, while referred to as user-specific features, they may be applicable to multiple users. Some features, however, may rely on intra-session interactions between the search system and the user, and thus may not be able to be shared across different users. Individual search system components may be responsible for generating the contextual signals, and also for assigning a score to the contextual signals or even to each user-specific feature that indicates a reliability factor, a confidence level, or a relevance of each signal or feature in relation to the user and/or the search query. These components deliver not only the contextual signals, but also re-ranking guidance, such as an indicator of how or what to change or what to prefer in rankings. While contextual signal providers 208 may be internal components to the search system, they may also be external components not associated with the search system. In some embodiments, the contextual signal providers 208 may not provide contextual signals directly through the network 206.

The contextual search system ranker 210 is responsible for ranking or re-ranking documents from the set of non-contextual search results using the contextual signals received from the contextual signal providers 208. The contextual search system ranker 210 includes various components, including a feature extraction component 212, an evaluating component 214, a comparing component 216, a position determining component 218, and a re-ranking component 220. Other components may also be used, although not illustrated in FIG. 2. Initially, the feature extraction component 212 receives the contextual signals from the contextual signal providers 208 and extracts the various information included in these signals, including user-specific features or properties and scores that indicate how important or relevant the features are to the user and/or the search query.

The evaluating component 214 evaluates the user-specific features to determine the relevance, importance, and degree of confidence there is in each feature prior to using a particular feature in the re-ranking process. The comparing component 216 is used to compare the various user-specific features to each other to determine which is most important, relevant, etc. The evaluating component 216 and the comparing component 216 oftentimes work hand-in-hand. For instance, while evaluating the scores provided by the contextual signal providers 208 or the features themselves, the features may be compared to each other.

There are many ways for evaluating and comparing the user-specific features. In one embodiment, a machine-learning model is used to gradually learn more about the users, search queries, documents in the search results, etc. so that the documents in future sets of search results can be positioned in the optimal location on the search results page. Machine learning is a branch of artificial intelligence associated with the design and development of algorithms that allow computers to evolve behaviors based on empirical data. Data is used as examples that illustrate relationships between observed variables such that a machine-learning model can automatically learn to recognize complex patterns and make intelligent decisions based on data. Many approaches can be taken with machine learning. For instance, decision tree learning is one approach that uses a decision tree as a predictive model that maps observations about an item to conclusions about the item's target value. Bayesian network is another approach that uses a probabilistic graphical model that represents a set of random variables and their conditional independencies by way of a directed acyclic graph. Some algorithms that may be used include the ClickPredict algorithm, which is a type of event prediction that uses learnt information to predict events in order to control a system, and may be used in various ways. Other algorithms include RankNet, LambdaRank, boosted tree, and LambdaMART. Regardless of the algorithm used, the machine-learning model uses data in its future evaluation and comparison of user-specific features and scores.

In one embodiment, the scores provided from the different contextual signal providers 208 are normalized. Normalization converts the scores from the contextual signal providers 208 into a common numerical space that is comparable to the original ranked list. This allows for the user-specific features to be compared to each other on an even playing field. In one instance, this occurs by generating a probability and confidence level of a user's document selections when it is placed at position one, or at the very top of the list of search results. As mentioned, the ClickPredict algorithm is one way of accomplishing this. While the process of normalization is described here, it is only one way of evaluating and comparing the user-specific features provided by the contextual signals. The raw scores provided by the contextual signal providers 208 may also be used without normalizing the scores.

If normalization of scores is used or some other method to put the user-specific features on the same playing field, these scores may be adjusted using a trust weight and a position bias effect of ranking a particular document at the top, or at the number one position in a list of search results. The trust weight may be different for each contextual signal provider 208, and in one embodiment is based on historical performance. For instance, if the re-ranking system has used features from a particular contextual signal provider and the user positively responded to the re-ranked documents, the trust weight may be high for that particular contextual signal provider. Conversely, if the user does not respond to re-ranked documents over a period of time, a trust weight may decrease for a contextual signal provider whose information influenced the re-ranking of documents. Once adjusted, a final relevance score is obtained for each feature. These scores are aggregated across all signals, and for all documents. In embodiments, a weighted value for each document's current position or score in the list of non-contextual search results is also taken into account.

The position determining component 218 uses the data, such as scores to determine the new position or rank of the documents. The re-ranking component 220 then re-ranks the documents according to their new position. For instance, a document that was previously in the third from the top position in the set of non-contextual search results may now be in the first or second position if it was determined, from the contextual signals, that the result is more important than previously considered. Likewise, if, from the contextual signals, it is determined that the particular document in the third position is less relevant or less important to the user or to the query, it will be moved down in the list.

While re-ranking documents from a list of search results is described herein, similar methods may also be used for re-ranking lists of data sources. Contextual signals, for instance, may indicate a user's observed or predicted preference for certain data sources ahead of others. Thus, although the default data source ranker may order the data sources for the query "Seattle weather" as <weather information, Web documents, images>, the user's contextual signals (e.g., from repeated clicks on the image document lists in previous queries within the session) may indicate the user's strong preference for image results. Therefore, the contextual signal re-ranker may then re-order these data sources as <images, weather information, Web documents>. The above is provided simply as an example, and is not meant to limit the scope of the present invention. Other data sources that may be used for the re-ranking process may include news articles, Smartphone application marketplaces, games, etc.

Figure 3:
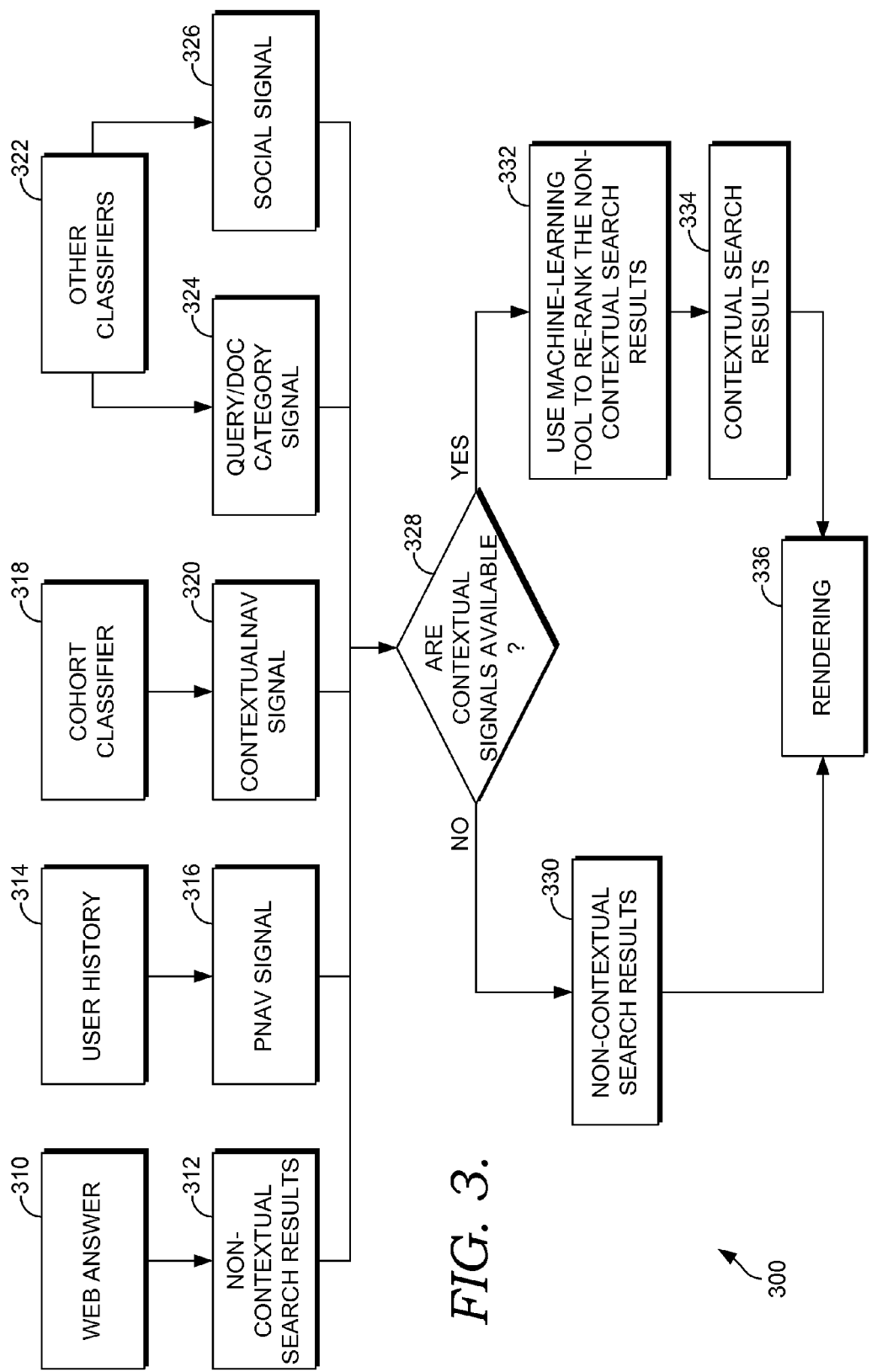
FIG. 3 is a process flow diagram illustrating the ranking of contextual signals, in accordance with embodiments of the present invention.

Turning now to FIG. 3, a process flow diagram 300 is shown for ranking contextual signals, in accordance with embodiments of the present invention. As mentioned, contextual signals are received from contextual signal providers, and provide user-specific information, such as features or properties, that can be used to alter or annotate a set of non-contextual search results. Here, a non-contextual ranker 310 provides non-contextual search results 312. User history 314, which has stored various personal features for users, provides a personal re-ranking signal 316 that may be retrieved from storage, such as from query logs or other logged data that is personalized for the user who submitted the search query. For exemplary purposes only, a personalized signal may provide a user-specific feature that indicates that for a query "genome," the result www.genome.gov, which may otherwise appear as search results number two, is the result the user is actually most interested in. As a result, the search result www.genome.gov is re-ranked at position number one, and another result, such as the Wikipedia entry for genome is demoted from the first position to the second position. More information on the use of personalized signals and preferences can be found in U.S. application Ser. No. 12/784,969 entitled "Personalized Navigation Using a Search Engine" filed on May 21, 2010, which is hereby incorporated by reference in its entirety.

The cohort classifier 318 produces a location-biased signal 320. Location-biased signals are based on a user's behavior at a particular location. The input to the cohort classifier 318 may be the user's location. For instance, for the query "SMH," many different results may be likely what the user is looking for, but the best way to determine which search result the user actually wants to see is by comparing the user's location to the location associated with the documents in the list of non-contextual search results. For instance, "SMH" may refer to a manufacturing company, a mental health clinic located in Seattle, or the Sydney Morning Herald. There are many contextual signals being received in parallel for the query "SMH" and it is the re-ranking system's responsible to determine which documents, based on the contextual signals, that the user wants to see. Another example is if the query is "ACS", it may be determined from the contextual signals that www.acsalaska.com, which, for exemplary purposes only, may be listed as the seventh search result, is what the user likely wants to see based on the user's location, previous search queries, etc. The result www.acsalaska.com thus may be re-ranked to position number one and other results are pushed down. To illustrate how the contextual and personalized signals work together, for the query "ACS," there may be a high probability that www.acsalaska.com is the user's actual intent. But the personalized signal indicates, for the same query, that the user is really interested in www.acs.org. A decision is made based on the confidence scores provided by the respective contextual signal providers that www.acs.org should be ranked in the first position and ww.acsalaska.com should be ranked in the second position. The other documents are thus pushed down.

Other classifiers 322 are also used to produce signals, such as a query/doc category signal 324 or a social signal 326. The query/doc category signal 342, in one embodiment, has access to the list of non-contextual search results so that it can use this information when it sends out its contextual signals. The social signal 328 may retrieve its user-specific feature information from social networking sites, which may be able to indicate the user's current location, the user's current (e.g., such as for today) interests, who the user is friends with, the friend's interests, etc.

A decision is made at block 328 as to whether any contextual signals are available. If not, the list of non-contextual search results 330 are sent to rendering 336 and ultimately returned to the user without any re-ordering or re-ranking, as contextual information is not available. If contextual signals are available, a machine-learning model, in one embodiment, is used at step 332 to re-rank the non-contextual search results such that contextual search results 334 are generated. They are sent to rendering 336, and ultimately to the user.

Figure 4:
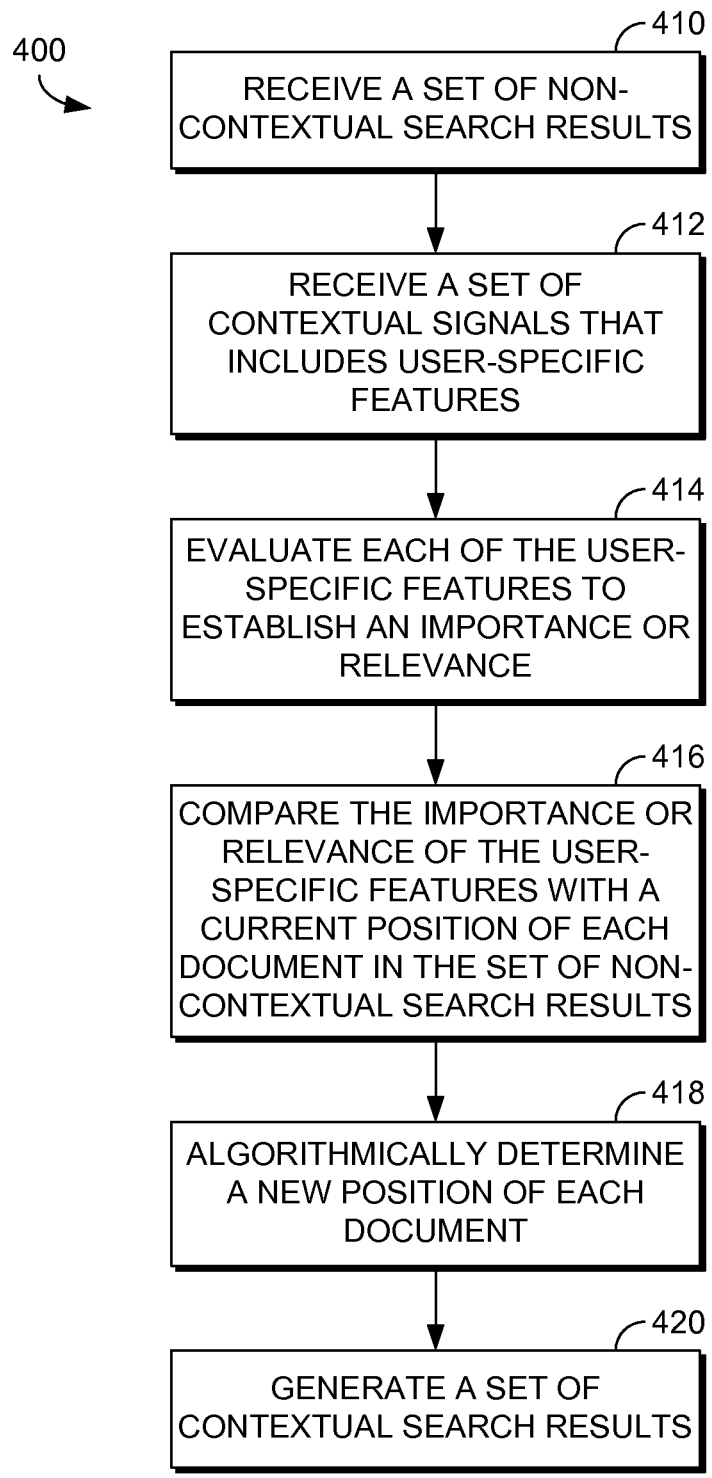
FIGS. 4-6 are flow diagrams showing methods for using multiple contextual signals to re-rank search results, in accordance with embodiments of the present invention.

FIG. 4 is a flow diagram showing a method 400 for using multiple contextual signals to re-rank search results, in accordance with an embodiment of the present invention. Initially at step 410, a set of non-contextual search results is received that is generated as a result of a search query entered by a user. The non-contextual search results are generated based on a search index, for instance, without taking into account user-specific properties or features. At step 412, a set of contextual signals is received that includes user-specific features. These user-specific features can be used to re-rank documents included in the set of non-contextual search results, as they shed light as to who the user is and what his or her interests are. The contextual signals may be received from two or more contextual signal providers in one embodiment. Optionally, it may be determined whether each of the received contextual signals is below a minimum trusted threshold for the particular user and search query. In some instances, all of the contextual signals may fall below a threshold, and in that case, the set of non-contextual search results is returned to the user without any re-ranking. If some of the contextual signals are above the threshold, however, those are the contextual signals that are used in re-ranking the documents. In addition to user-specific features, the contextual signals may also include a confidence score that indicates a confidence level of the contextual signal provider as to its confidence of how good each user-specific feature is. This confidence score may be taken into consideration when the documents are re-ranked.

In one embodiment, while multiple contextual signals may be sent to the re-ranking system, some of those signals may be missing and thus not received at the re-ranking system. The algorithms described herein handle the situation where one or more of the signals are missing and thus the re-ranking system receives just one contextual signal. As such, the documents may be re-ranked based on just that one contextual signal that was received. This may occur due to outages, failures, etc.

Each of the user-specific features is analyzed at step 414 to establish an importance or relevance of each feature in relation to user and/or the query. Some user-specific features received by contextual signal providers may be irrelevant in relation to the user and the query, but others may be extremely relevant. As mentioned, some contextual signal providers may have as an input the query, the set of non-contextual search results or other inputs, but some may not have any input, and thus may provide information that is irrelevant to the user and query. At step 416, the importance and/or relevance of the user-specific features are compared with each other, and with a current position of each document in the set of non-contextual search results. For instance, it is determined whether a user-specific feature that specifies that the user has recently been searching for Nikon cameras is relevant to the documents, or whether it would effect the positioning of any of the documents in the search results. Taking this to another level, it is determined as to what extent the user-specific features would effect the positioning, such as whether a document currently in the number five position should be moved to the number four position or the number one position. In embodiments, a machine-learning model is used to evaluate and compare the user-specific features. The machine-learning model uses algorithms to learn which of the user-specific features are more important in re-ranking the documents and the optimal placement of those results.

Even further, in embodiments, normalization is used to compare the user-specific features so that all features are on the same playing field and thus can be compared. In one instance, scores are received from contextual signal providers indicating a relevancy or importance of each of the user-specific features. The scores are normalized by converting the scores into a common numerical space to generate normalized scores. This is typically done using one of many algorithms. The normalized scores are then adjusted based on a level of trustworthiness associated with the associated contextual signal provider that provided a particular user-specific feature, or based on a position bias effect that indicates an effect of positioning a particular document in a certain position. Further, a probability and confidence are generated indicating whether the user will select a particular document when it is positioned in a certain position, such as at the top or in the number one position of the set of contextual search results.

At step 418, a new position for each document in the set of non-contextual search results is algorithmically determined based on the comparison previously performed. A set of contextual search results is then generated at step 420, and is generated utilizing the new position of each document determined above.

Figure 5:
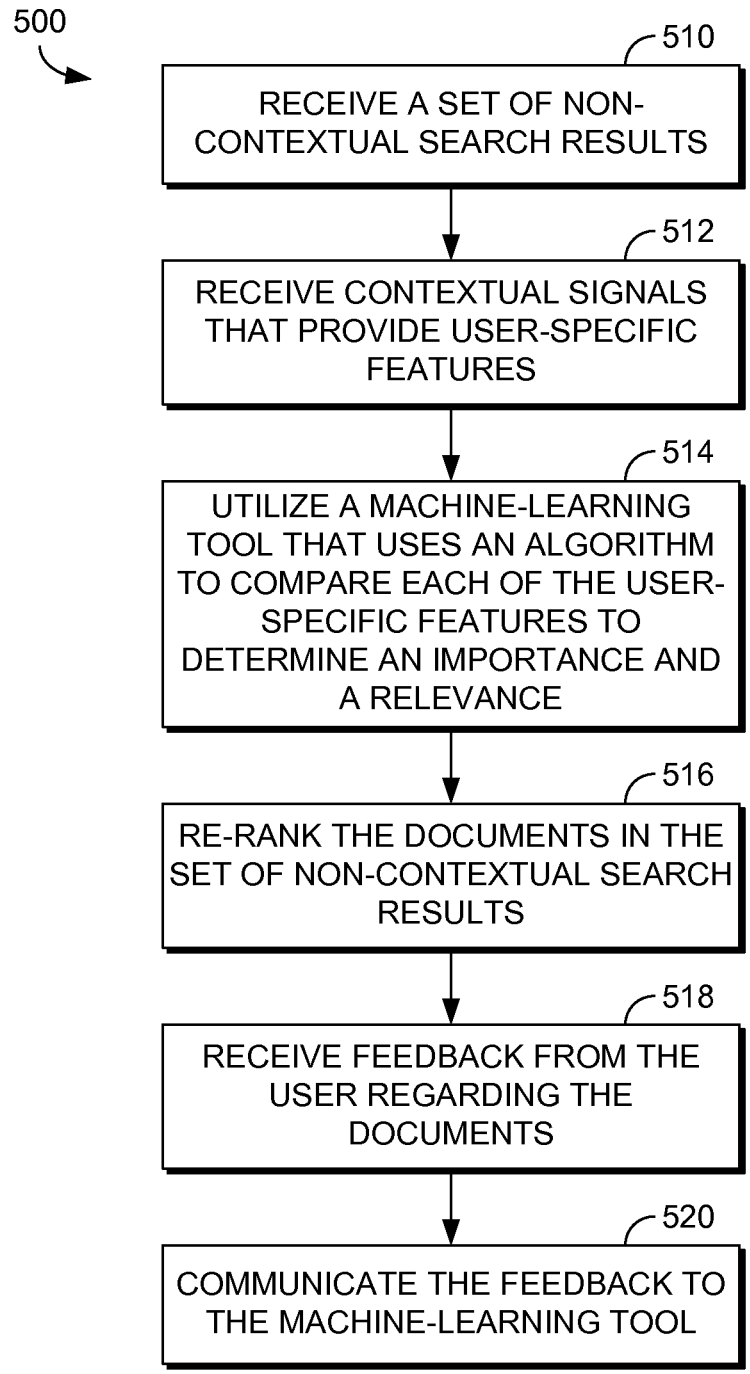

Referring to FIG. 5, a flow diagram is shown of a method 500 for using multiple contextual signals to re-rank search results, in accordance with an embodiment of the present invention. Initially, a set of non-contextual search results is received at step 510 based on a search query submitted by a user. Contextual signals that provide user-specific features are received at step 512. The contextual signals are provided by contextual signal providers, which may be components of the search system and may thus be internal components, or may be external such that they are not components of the search system. The user-specific features are associated with the user who submitted the search query. Contextual signals may include any type of information, but for exemplary purposes only, may include the user's current location (city, state, zip code, restaurant, store), a location associated with the documents in the set of non-contextual search results, tasks that the user is currently or previously engaged in, query log data, demographics associated with the user, social-based data, time of day, time of the year, etc.

At step 514, a machine-learning model is utilized to compare the user-specific features to determine how important or how relevant each of the features are in relation to the user, the search query, and the document in the set of non-contextual search results. For instance, a certain user-specific features may be particularly relevant or important to a particular document, and thus can be used to determine a new position of that document in the search results. The machine-learning model utilizes one or more algorithms that are designed to take learned data and use it to understand a user's behavior. In one embodiment, the machine-learning model uses normalization to compare the features. For instance, the machine-learning model may normalize scores received from contextual signal providers indicating a relevancy and/or an importance of each of the user-specific features. The scores may also take into account how confident the contextual signal provider is in a particular user-specific feature being useful in re-ranking the documents. The normalized scores may then be adjusted based on various factors, such as a level of trustworthiness associated with a contextual signal provider that provided a particular user-specific feature based on prior experiences, or a position bias effect that indicates an effect of positioning a particular document in a certain position (e.g., in the top or first position in a list of search results).

At step 516, the documents in the set of non-contextual search results are re-ranked based on the comparison of the user-specific features. As such, a set of contextual search results is generated. The set of contextual search results is communicated to the user. The user, when utilizing the search results, may select certain documents or take other actions in relation to the documents. This information can be used as feedback, which can be fed back into the machine-learning model. For instance, at step 518, feedback is received from the user regarding the documents in the set of contextual search results. The feedback is communicated to the machine-learning model at step 520. The machine-learning model utilizes the feedback in its comparison of each of the user-specific features in determining the importance and/or relevance of the user-specific features in relation to future search queries received form the user and other users. As mentioned, the feedback may include selections made by the user of the documents in the list of search results. The feedback may indicate the user's preference for certain data sources over others. Data sources include web documents, images, weather information, videos, stock information, news articles, etc.

Figure 6:
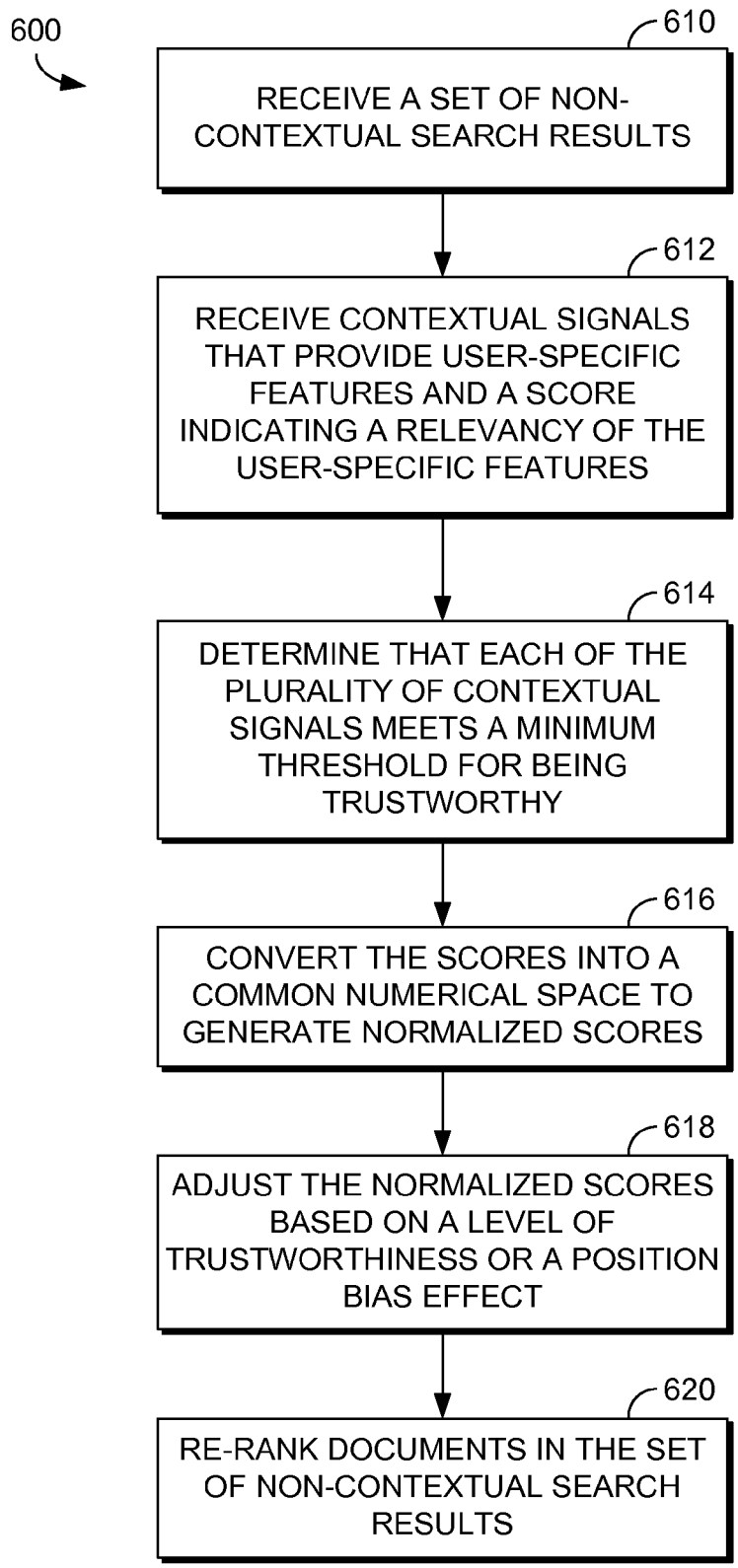

Turning to FIG. 6, a flow diagram is illustrated of a method 600 for using multiple contextual signals to re-rank search results, in accordance with an embodiment of the present invention. At step 610, a set of non-contextual search results is received based on a search query entered by a user. Contextual signals are received at step 612 that provide user-specific features and a score indicating a relevancy of the user-specific features. At step 614, it is determined that each of the contextual signals meets a minimum threshold for being trustworthy in relation to the user and the search query. Whether the contextual signals meet this threshold may be based on previous usage of contextual signals received from the contextual signal providers and its impact on subsequent document selection and interaction based on user behaviors. For instance, if the contextual signals have not provided relevant or important user-specific information in the past, they may not meet the minimum threshold for being trustworthy. The contextual signals may also not prove to have been useful for certain queries.

At step 616, the scores provided in the contextual signals are converted into a common numerical space to generate normalized scores for the user-specific features. In one embodiment, a probability and a confidence that the user will select a particular document when it is positioned at the top of the list of search results are generated. This probability and confidence are used to convert the scores to normalized scores. The normalized scores are adjusted at step 618 based on a level of trustworthiness or a position bias effect. The level of trustworthiness is a level associated with a contextual signal provider that provided a particular user-specific feature. A position bias effect indicates an effect of positioning a particular document in a certain position, such as in the top or number one position of a list of search results. At step 620, the documents from the set of non-contextual search results are re-ranked based on the adjusted normalized scores and sent to the user.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-storage media devices storing computer-useable instructions that, when used by a computing device, cause the computing device to perform a method for using multiple contextual signals to re-rank search results, the method comprising:
   receiving a set of non-contextual search results generated as a result of a search query entered by a user;
   receiving a set of contextual signals that include user-specific features that can be used to re-rank documents in the set of non-contextual search results, the set of contextual signals being received from a source other than the user;
   prior to communicating the set of non-contextual search results for presentation to the user, evaluating each of the user-specific features by a machine-learning model to establish an importance or relevance of each of the user-specific features in relation to the user and the search query;
   comparing the importance or relevance of the user-specific features, by the machine-learning model, with a current position of each document in the set of non-contextual search results, wherein the machine-learning model uses one or more algorithms to learn which of the user-specific features are more important in re-ranking the documents in the set of non-contextual search results;
   based on the comparison, algorithmically determining a new position of each document in the set of non-contextual search results; and
   utilizing the new position of each document in the list of search results to generate a set of contextual search results.

2. The computer-storage media devices of claim 1, wherein the contextual signals are received from two or more contextual signal providers.

3. The one or more computer-storage media devices of claim 1, wherein evaluating each of the user-specific features further comprises utilizing feedback from the user in relation to the set of contextual search results returned to the user.

4. The one or more computer-storage media devices of claim 1, further comprising determining whether each of the contextual signals is below a minimum trusted threshold for the particular user and the received search query.

5. The one or more computer-storage media devices of claim 4, wherein if all of the contextual signals are below the minimum trusted threshold, returning the set of non-contextual search results to the user.

6. The one or more computer-storage media devices of claim 1, wherein the contextual signals further include a confidence score that indicates a confidence level as to how confident a contextual signal provider is with the corresponding user-specific feature.

7. The one or more computer-storage media devices of claim 6, further comprising utilizing the confidence scores to re-rank the documents in the set of non-contextual search results.

8. The one or more computer-storage media devices of claim 1, further comprising:
   receiving scores from contextual signal providers indicating a relevancy or an importance of each of the user-specific features;
   normalizing the scores by converting the scores into a common numerical space to generate normalized scores; and
   adjusting the normalized scores based on one or more of,
   a level of trustworthiness associated with a contextual signal provider that provided a particular user-specific feature, or a position bias effect that indicates an effect of positioning a particular document in a certain position.

9. The one or more computer-storage media devices of claim 8, wherein normalizing the scores further comprises generating a probability and a confidence that the user will select a particular document when it is positioned at the top of the set of contextual search results.

10. One or more computer-storage media devices storing computer-useable instructions that, when used by a computing device, cause the computing device to perform a method for using multiple contextual signals to re-rank search results, the method comprising:
   receiving a set of non-contextual search results based on a search query received from a user;
   receiving contextual signals that provide user-specific features associated with the user, the contextual signals being received from a source other than the user;
   prior to communicating the set of non-contextual search results for presentation to the user, utilizing a machine-learning model that uses an algorithm to compare each of the user-specific features associated with the user to determine which of the user-specific features are more important in re-ranking documents in the set of non-contextual search results;
   re-ranking the documents in the set of non-contextual search results based on the comparison of the user-specific features to generate a set of contextual search results;
   receiving feedback from the user regarding the documents in the set of contextual search results; and
   communicating the feedback to the machine-learning model, wherein the machine-learning model utilizes the feedback in its comparison of each of the user-specific features in determining the importance and the relevance of the user-specific features in relation to future search queries received from the user and other users.

11. The one or more computer-storage media devices of claim 10, wherein the feedback from the user comprises selections made by the user of the documents in the set of contextual search results.

12. The one or more computer-storage media devices of claim 10, wherein the feedback indicates the user's preference for certain data sources over others, wherein the data sources include web documents, images, weather information, stock information, news articles, and videos.

13. The one or more computer-storage media devices of claim 10, further comprising communicating the set of contextual search results to the user.

14. The one or more computer-storage media devices of claim 10, wherein the contextual signals include two or more of the user's location, a location associated with the documents in the set of non-contextual search results, tasks that the user is engaged in, query log data, demographics associated with the user, or social-based data.

15. The one or more computer-storage media devices of claim 10, wherein the machine-learning model normalizes scores from contextual signal providers indicating a relevancy or an importance of each of the user-specific features.

16. The one or more computer-storage media devices of claim 15, further comprising adjusting the normalized scores based on one or more of,
   a level of trustworthiness associated with a contextual signal provider that provided a particular user-specific feature, or
   a position bias effect that indicates an effect of positioning a particular document in a certain position.

17. One or more computer-storage media devices storing computer-useable instructions that, when used by a computing device, cause the computing device to perform a method for using multiple contextual signals to re-rank search results, the method comprising:
   receiving a set of non-contextual search results based on a search query received from a user;
   receiving a plurality of contextual signals that provide user-specific features that are used to re-rank documents in the set of non-contextual search results, the plurality of contextual signals including a score indicating a relevancy of each of the user-specific features;
   determining that each of the plurality of contextual signals meets a minimum threshold for being trustworthy in relation to the user and the search query;
   converting the scores associated with the user-specific features into a common numerical space to generate normalized scores for the user-specific features;
   adjusting the normalized scores based on one or more of,
   a level of trustworthiness associated with a contextual signal provider that provided a particular user-specific feature, or
   a position bias effect that indicates an effect of positioning a particular document in a certain position; and
   re-ranking documents in the set of non-contextual search results based on the adjusted normalized scores, wherein normalizing the scores further comprises generating a probability and a confidence that the user will select a particular document when it is positioned at top of a set of contextual search results.

18. The one or more computer-storage media devices of claim 17, further comprising:
   generating a probability and a confidence that the user will select a particular document when it is positioned at the top of the set of contextual search results; and
   utilizing the probability and the confidence to convert the scores to normalized scores.

* * * * *